United States Patent [19]

Monroe

[11] 4,359,811
[45] Nov. 23, 1982

[54] METHOD OF COATING OR LINING METALS

[75] Inventor: Paul S. Monroe, Chatham, N.J.

[73] Assignee: The Halcon SD Group, Inc., New York, N.Y.

[21] Appl. No.: 179,929

[22] Filed: Aug. 20, 1980

[51] Int. Cl.³ .............................................. B23P 17/00
[52] U.S. Cl. .................................... 29/421 R; 29/523; 72/54
[58] Field of Search ................. 29/421 R, 523; 72/54, 72/364, 700

[56] References Cited

U.S. PATENT DOCUMENTS

| | | | |
|---|---|---|---|
| 714,903 | 12/1912 | Hinds | 29/421 R |
| 2,263,714 | 11/1941 | Bloomfield et al. | 29/421 R X |
| 2,458,189 | 1/1949 | Morgan | 72/62 X |
| 2,487,257 | 11/1949 | Morgan | 29/421 R UX |
| 2,982,360 | 5/1961 | Morton et al. | 29/523 UX |
| 3,432,905 | 3/1969 | Monroe | 29/423 X |
| 4,198,740 | 4/1980 | Prevender | 29/421 R |

FOREIGN PATENT DOCUMENTS

B 20029 10/1955 Fed. Rep. of Germany .... 29/421 R

*Primary Examiner*—Ervin M. Combs
*Attorney, Agent, or Firm*—William C. Long; Riggs T. Stewart; Harold N. Wells

[57] ABSTRACT

Coating or lining normally-corrodible tubular metal shapes with corrosion-resistant metal coatings or linings is effected by placing the tubular metal shape in concentric telescopic relationship with a tubular shape of the corrosion-resistant metal to provide an assembly consisting of an inner tubular member and an outer tubular member, closing the ends of the inner member, introducing a liquid into the interior of the inner member to fill that member, and then freezing the liquid while confined in the inner member, whereby the outer wall of the inner member is expanded into firm contact with the inner wall of the outer member. The process is typically applied to an assembly of the two shapes in concentric telescopic relationship with one of the shaped defining an inner member and the other of the shapes defining an outer member, a first cap and a second cap enclosing the ends of the inner member in fluid-tight relationship, and means for introducing a liquid through one of the caps.

3 Claims, 6 Drawing Figures

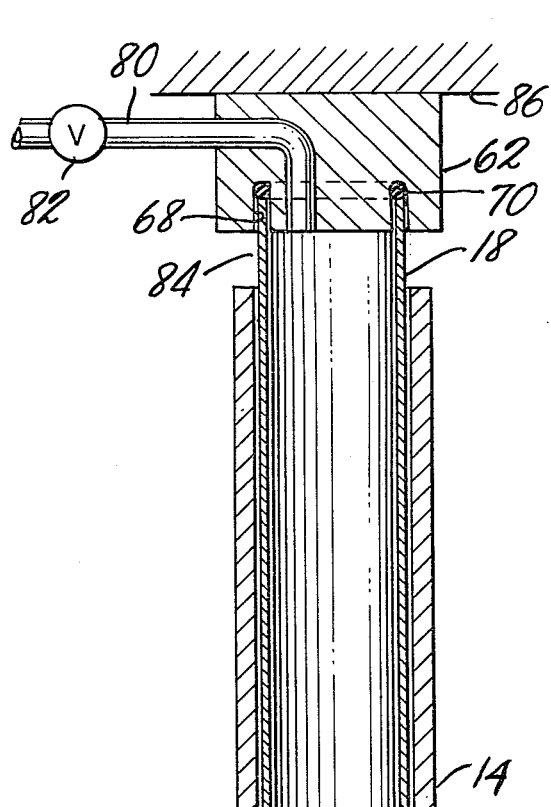
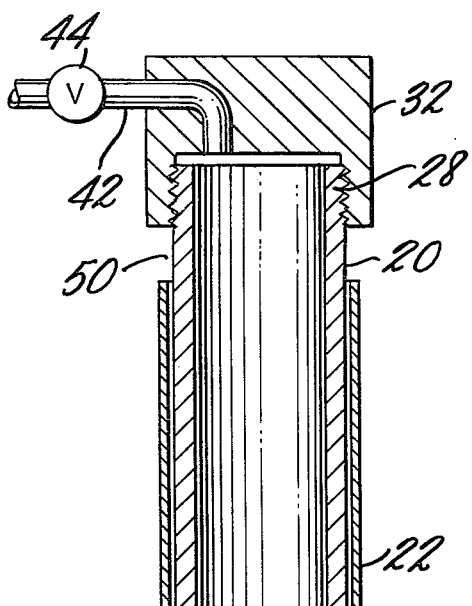
FIG. 6
FIG. 5

METHOD OF COATING OR LINING METALS

This invention relates to the application of metals to other metals, and more particularly to a method of coating or lining the interior of a pipe, a tube, or the like, with another metal.

Pipe, tubing and other cylindrically-shaped objects formed from various metals, often in alloyed form, particularly iron and steel, are subject to corrosion and deterioration as a result of the action of fluids brought into contact with such objects. This is frequently observed in the case of heat-exchange tubes, and tubes in chemical processing equipment. To avoid this corrosion problem, such tubing can be formed from a corrosion resistant metal, such as titanium or tantalum. Metals of this character, however, are expensive and when the required tubing must have a substantial thickness to withstand operating pressures, the cost becomes prohibitive. It has been proposed, therefore, to line or coat the surface of the corrosion-susceptible metal with a relatively thin layer of metal resistant to corrosion. Thus, for example, conduits, tubes, pipes and the like which come into contact with corrosive agents or atmospheres have had applied to their exposed surfaces a coating or lining of a metal resistant to the particular corrosive agent encountered. In the case of heat-exchanger tubing, and tubing in chemical equipment, titanium is often used.

Thus, corrosion-resistant layers have in the past been applied to the surface of the metal to be protected by a metalizing process or by electrolytic depositions, or by hammering or other mechanical distortion or by using a lining or coating composed of individual sections welded together in place on the surface to be protected. More recently, explosion techniques have been employed. Generally, the metal to be protected, e.g., in tubular or pipe form, will be one which is relatively inexpensive and which has sufficient thickness to provide the rigidity and strength required for the particular use, e.g., as chemical process piping or conduit. On the other hand, the corrosion-resistant lining or coating will be substantially more expensive than the substrate metal yet relatively thin, i.e., a thickness sufficient only to provide the desired corrosion-resisting protection.

The application of linings and coatings by the techniques heretofore employed, however, has posed many practical problems. For the most part, expensive, relatively massive equipment is often required, or very close control of each step is mandatory, and some of the methods also involve a certain element of danger especially when explosive forces are involved.

Accordingly, it is an object of this invention to provide an improved process for coating or lining a metal substrate with a corrosion-resistant metal layer.

Another object of this invention is to provide a process of the character indicated which avoids the disadvantages and drawbacks of prior methods.

Other objects and features of the invention will be apparent from the following description of illustrative embodiments with particular reference to the accompanying drawing, wherein FIG. 1 is a side-elevational view, partly in cross-section, of a chemical process tube having inserted in it a thin-walled liner formed from a corrosion-resistant metal;

Figure 1:
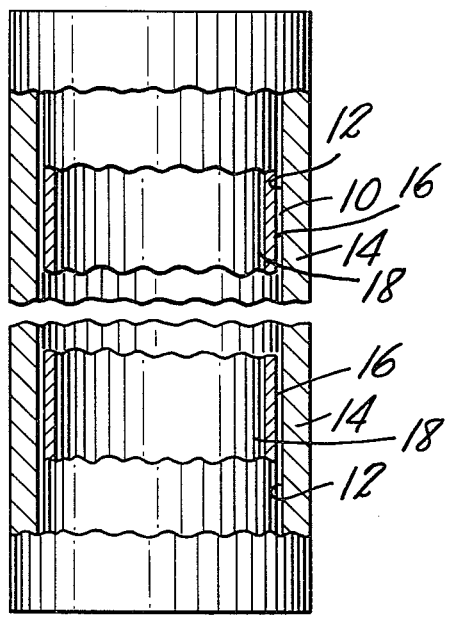

FIG. 5 is a cross-sectional view, partly in elevation, of a capping assembly employed in carrying out the process of the invention wherein a thin-walled sheath is applied to a heavy-walled pipe or tube; and FIG. 6 is a view similar to that of FIG. 5 except that it shows a capping assembly employed in carrying out the process of the invention wherein a thin-walled inner tube is applied to a heavy-walled outer pipe or tube.

In my U.S. Pat. No. 3,432,905 of Mar. 18, 1969, I describe the fabrication of a heat-transfer tube assembly involving tubes mounted in tube sheets by means of a process which employs freezing liquids. I have now discovered that I can employ freezing liquids for the coating or lining of tubes or pipes with corrosion-resistant metals to provide a highly satisfactory structure without the drawbacks and disadvantages of prior coating and lining methods. Thus, in accordance with the present invention, pipes, tubes and other cylindrical objects can have their exterior and interior surfaces effectively protected against corrosion by covering them with a thin layer of a non-corrosive metal derived from concentric tubing which is brought into intimate contact with the interior or exterior surface to be protected by means of the forces generated by the freezing of a liquid which expands upon freezing, especially water. More specifically, to provide an interior lining, a thin-walled tube of a corrosion-resistant metal, such as titanium, is inserted in the pipe or tube to be protected, the corrosion resistant tube is filled with the liquid to be frozen, e.g., water, the ends of the tube are firmly capped, and the assembly is exposed to temperatures low enough to cause freezing of the liquid in the tube, e.g., by placing in a refrigerated room or by immersion in a refrigerating bath of brine or the like.

In like manner, an exterior covering or coating can be provided upon the pipe or tube to be protected by surrounding it with a concentric thin-walled tube or sheath formed from a corrosion-resistant metal. The inner tube or pipe is filled with the liquid to be frozen, its ends are firmly capped and the assembly is exposed to temperatures which cause freezing of the liquid, as in the embodiment just described. In each case, the frozen liquid causes the inner tube of the assembly, whether it be the thin-walled tube as in the first embodiment or the thick-walled tube as in the second embodiment, to expand into intimate contact with the outer tube of the respective assembly.

It will, of course, be understood that as the inner tube of each assembly expands in response to the expansion of the liquid in passing into the solid state, its length will undergo a corresponding contraction. In accordance with the process of the invention, therefore, means are provided for maintaining the freezing liquid confined while accommodating the contraction of the tube, as will be described below. Similarly, it will be understood that the surfaces to be brought into contact, i.e., the outer surface of the inner tube and the inner surface of the outer tube should be clean and accordingly they should be suitably degreased and freed from scale, rust, dirt and the like before use in this process. Aside from this, however, no special treatment is required and it will be seen that equipment requirements are minimal and that this invention provides a highly effective very economical, non-hazardous process for lining or coating pipes or tubes and the like in a manner which makes possible the production of a coated or lined tubular structure having good heat transfer characteristics which is, of course, important when the finished assembly is to be used in a heat exchanger.

Figure 2:
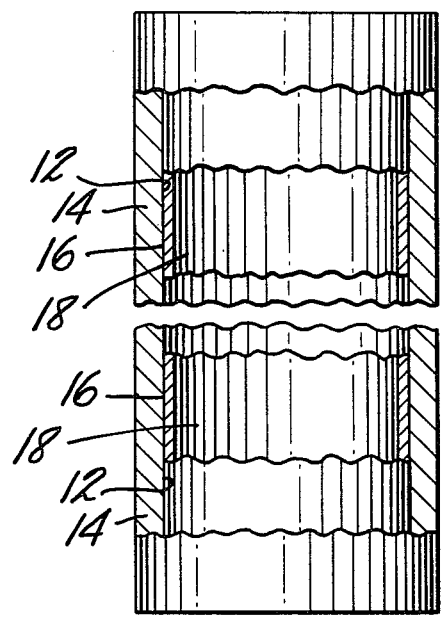
FIG. 2 is a similar view of the tube and liner of FIG. 1 after application of the process of the invention wherein the liner has been brought into intimate contact with the interior surface of the tube.

Referring more specifically to FIGS. 1 and 2, it will be noted that in FIG. 1, there is a small clearance 10 between the inner surface 12 of the outer pipe 14 and the outer surface 16 of the thin inner tube or sleeve 18. The greater the clearance between the inner tube and thick-walled pipe, the more easily the two can be assembled. However, clearance must not be so great that the tube 18, after expansion, will not be brought into contact with the surface 12. In determining the appropriate clearance, factors which need be considered include the metal used to form tube 18, the elastic limit of tube 18, the diameter of 18, and the fluid which is selected for freezing within the tube.

The maximum amount of tube expansion may be readily determined by filling a tube of the size to be used with liquid, say water, and placing it under freezing conditions. Alternatively, this expansion can be closely approximated by calculation. In the case of water, the increase in volume upon freezing is about 6%. Upon freezing, the increase in the outside diameter of the tube, will approach the 6% figure. This expanded diameter will indicate the maximum amount of clearance permissible. When the inner pipe or tube is expanded, it is expanded beyond its elastic limit and the clearance should be small enough that some expansion of the outer pipe or tube also occurs to ensure a firm contact between the two members.

Thus, in the assembly of FIGS. 1 and 2, the clearance 10 should be at most slightly less than the distance the outer wall of inner tube 18 will move when the liquid (not shown) with which it is filled is frozen. The same is true in the assembly shown in FIGS. 3 and 4 wherein an inner pipe 20 is inserted within an outer tube 22 of a corrosion-resistant metal with which the pipe 20 is to be coated so that the outer surface 24 of pipe 20 will be protected against corrosion. The clearance 26 shown in FIG. 3 disappears when the inner pipe 20 is expanded in accordance with the invention into contact with tube or sheath 22 and, in accordance with the preferred form of the invention, the clearance 26 is such that when the inner pipe 24 expands in response to the force generated by the freezing liquid inside pipe 20, the outer tube or sheath 22 also undergoes at least a slight expansion.

Figure 3:
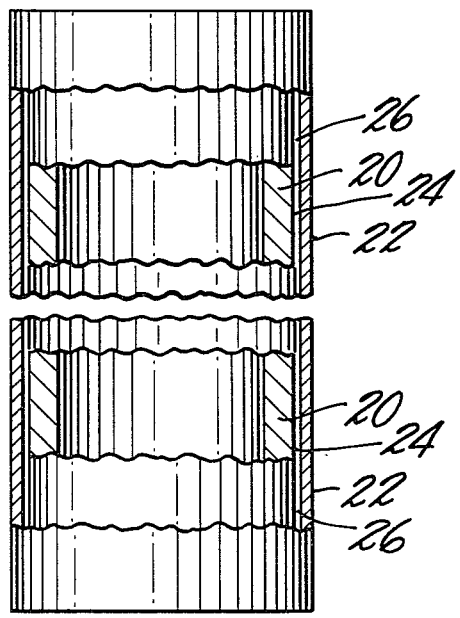
FIG. 3 is a side elevational view, partly in section, similar to FIG. 1, but showing a chemical process tube inserted in a thin-walled outer tube formed from a corrosion-resistant metal.
Figure 4:
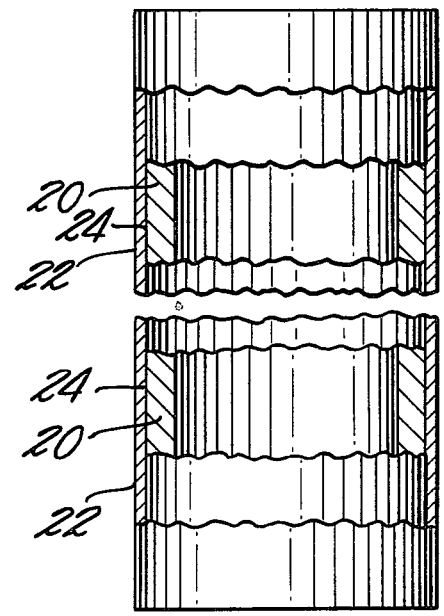
FIG. 4 is a similar view of the tube and outer tube after application of the process of the invention wherein the tube and outer tube of FIG. 3 have been brought into intimate contact to provide a corrosion-resistant outer coating for the tube.

Referring now to FIG. 5, there is shown an assembly for bringing about the coating of a relatively thick-walled pipe or tube with a thin-walled coating, i.e., the conversion of the structure shown in FIG. 3 into the structure shown in FIG. 4. As seen in FIG. 5, the thick-walled inner pipe 20 is threaded at its ends as shown at 27 and 28 to receive an inlet cap 30 and an outlet or vent cap 32. The inlet cap 30 is formed with a bore 34 communicating with the interior of pipe 20 which is to be expanded into contact with outer coating or sheath 22. Connected to the bore 34 by a suitable connector 36 is a flexible tube 38 provided with a valve 40 and connected to a source of the liquid to be frozen, e.g., water.

Outlet or vent cap 32 is provided with a vent line 42 in which is inserted a valve 44. Since the inner pipe 20 will decrease in length when it is radially expanded, it is necessary to provide a clearance, indicated at 50, to accommodate the expansion, as will be apparent to persons skilled in the art.

When the process of the invention is applied to the assembly of FIG. 5, the liquid to be frozen, e.g., water, is introduced through line 38 and through bore 34 into the interior of pipe 20 until the pipe is filled. Any air present can be vented through line 42 under the control of valve 44. The capped pipe assembly shown in FIG. 5 is then subjected to temperatures which will cause the freezing of the liquid inside pipe 20. This will cause pipe 20 to expand into contact with outer sheath 22 and will also cause the outer sheath to expand slightly. When the assembly is returned to ambient temperature, the outer sheath 22 will be firmly connected to pipe 20 and will provide a corrosion-resistant coating for it. The caps are removed and the ends of the coated pipe are then cut off to provide the finished product. It will, of course, be understood that the caps are formed of sufficiently heavy metal that they will not undergo expansion and that the expansion will occur in the portion of the pipe between the caps.

When a thick-walled pipe is to be lined with a thin-walled corrosion-resistant tube or liner, a different method of capping is employed since it is not generally practicable to apply threaded caps to thin-walled tubing which may typically have a thickness of the order of 0.02 to 0.04 inch. Referring to FIG. 6, therefore, there is shown a representative capping assembly for applying a thin-walled liner in accordance with the process of this invention. In FIG. 6, the thin-walled liner 18 has at its ends inlet cap 60 and outlet cap 62. Cap 60 is formed with a annular recess 64 in which is seated a circular gasket or sealing ring 66 and, in like manner, outlet cap 62 is provided with an annular recess 68 in which is seated a circular gasket or sealing ring 70. The ends of liner 18 extend into annular recess 64 and 68 and engage gaskets 66 and 70. Inlet cap 60 is formed with a bore 72 to which is connected, with a connector 74, a flexible line 76 for the admission of the liquid to be frozen. Line 76 is provided with a valve 78. Outlet cap 62 is provided with a vent line 80 in which is found a valve 82. In order to accommodate the decrease in length which will occur upon the expansion of line 18, there is provided a clearance 84. At the same time, in order to maintain the liquid effectively sealed inside liner 18 at all times, means are provided for maintaining the ends of liner 18 in continuous firm contact with sealing rings 66 and 70. These means comprise a fixed abutment 86 against which outlet cap 62 rests and a ram 88 which is acted upon hydraulically or mechanically (by means not shown) to force it under predetermined pressure in the direction of abutment 86. Typically, pressures of 2,000 to 3,000 psi and above are maintained by the ram 88 during the carrying out of the process of this invention with an assembly of the type shown in FIG. 6. The process of the invention is carried out to expand liner 18 into firm contact with outer pipe 14 substantially as described in connection with FIG. 5. Thus, the fluid to be frozen, e.g., water, is introduced through inlet line 76 into the interior of liner 18 after ram 88 has been activated to ensure firm engagement of the ends of tube 18 with sealing rings 66 and 70. Any air is vented through vent line 80 and liner tube 18 is filled with the liquid. The assembly is then exposed to temperatures which will cause the freezing of the liquid inside liner 18, liner 18 will expand and outer pipe 14 will also be expanded to a slight degree. The pressure on ram 88 is then relieved, the lined pipe assembly is removed from caps 60 and 62 and the ends of the lined pipes are cut off to provide the finished product in which the corrosion-resistant liner 18 is in firm engagement with the surrounding pipe 14.

In a typical application of the process of the invention for lining a pipe with a corrosion-resistant liner, a section of steel pipe having an outside diameter (O.D.) of 2.500 inches and an inside diameter (I.D.) of 2.065 inches has a section of a tantalum or titanium tube of 2.00 inches O.D. and 1.97 inches I.D. inserted in it. There is, of course, a clearance of 0.0325 inch. Following the application of the process of the invention, e.g., as described in connection with FIG. 6, the finished lined structure is composed of an outer steel pipe of 2.502 inches O.D. and an inner corrosion-resistance liner of 2.037 inches I.D.

In a typical application of the process of the invention for coating a pipe with a corrosion-resistant coating or sheath, a section of steel pipe having an I.D. of 2.065 inches and an O.D. of 2.500 inches is inserted into a corrosion-resistant sheath having an I.D. of 2.565 inches and an O.D. of 2.630 inches, leaving a clearance of 0.032 inch. Following the application of the process of the invention as described in connection with FIG. 5, the finished coated structure is composed of an inner steel pipe of 2.168 inches I.D. and 2.107 inches O.D. coated with a corrosion-resistant sheath having an I.D. of 2.575 inches and an O.D. of 2.650 inches.

The assemblies shown in FIGS. 5 and 6 are vertically positioned for freezing, which is the preferred arrangement, but they can also be frozen in a horizontal position if desired. In FIGS. 5 and 6, a clearance between the inlet caps and the unsecured sheath or liner can be provided by flexible tubular "shims," e.g., formed from rubber or the like, in order to space the outer member outlet between the end caps. It will thus be apparent that various changes and modifications may be made in the illustrative embodiments without departing from the scope of the invention as defined in the appended claims and it is intended, therefore, that all matter contained in the foregoing description and in the drawings shall be interpreted as illustrative only and not as limitative of the invention.

What is claimed is:

1. A method of coating or lining normally corrodible tubular metal shapes with corrosion-resistant metal coatings or linings which comprises placing the tubular metal shape in concentric telescopic relationship with a tubular shape of the corrosion-resistant metal to provide an assembly consisting of an inner tubular member and an outer tubular member, closing the ends of the inner member but permitting unrestricted axial movement of said inner member relative to said outer member, introducing a liquid into the interior of the inner member to fill said member, and freezing said liquid while confined in said inner member, whereby the outer wall of said inner member is expanded into firm contact with the inner wall of the outer member.

2. A method as defined in claim 1, wherein the inner member is the corrosion-resistant metal shape and it forms a liner for the corrodible tubular shape upon freezing of the liquid.

3. A method as defined in claim 1, wherein the inner member is the corrodible metal shape and it is enclosed by the corrosion-resistant metal shape as a coating upon freezing of the liquid.

* * * * *